March 21, 1961 B. I. ULINSKI 2,975,923
SWINGING AND EXTENDING FORKS
Filed Oct. 13, 1958 6 Sheets-Sheet 1
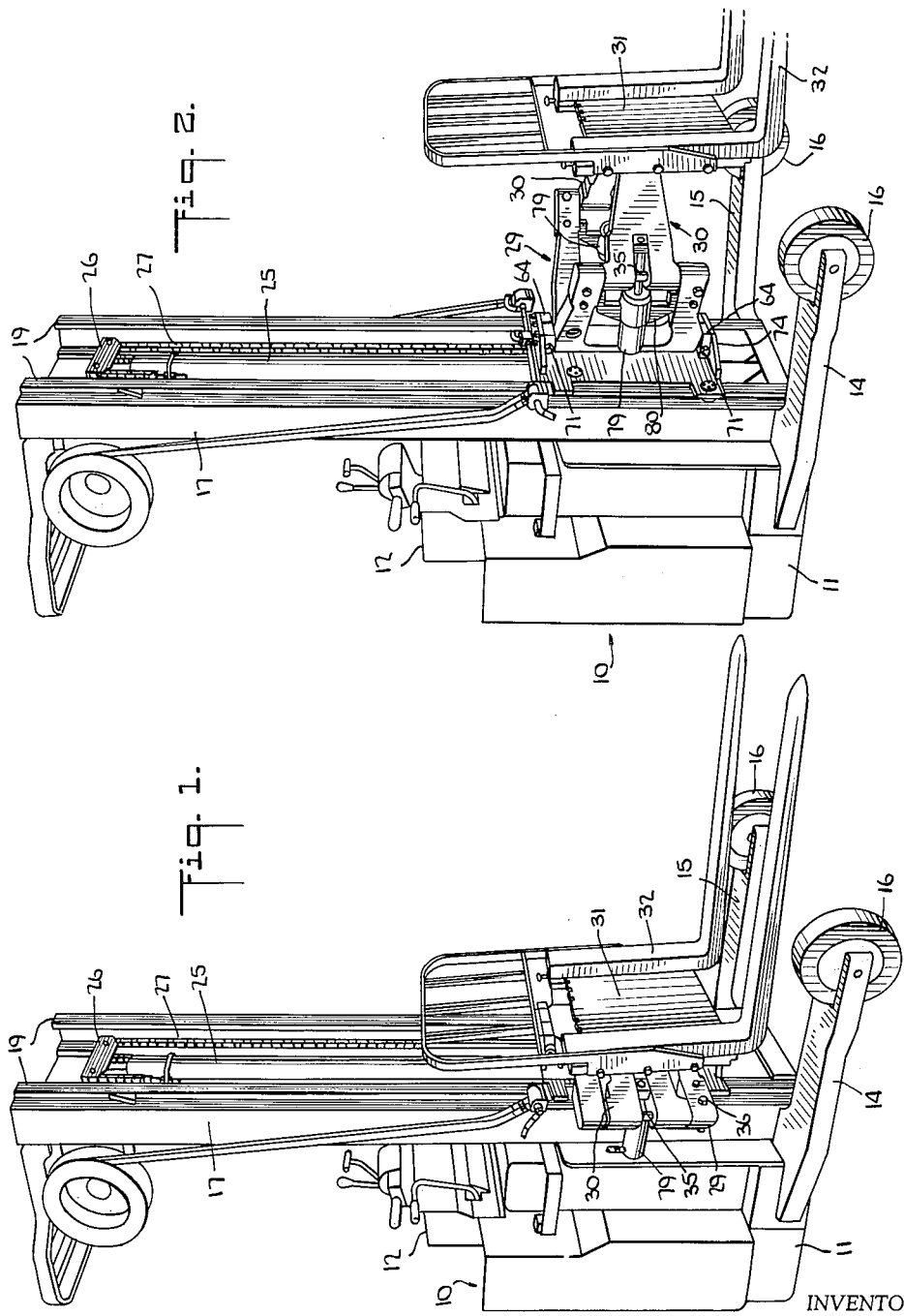
INVENTOR.
BRONISLAUS I. ULINSKI
BY
*A. H. Golden*
ATTORNEY

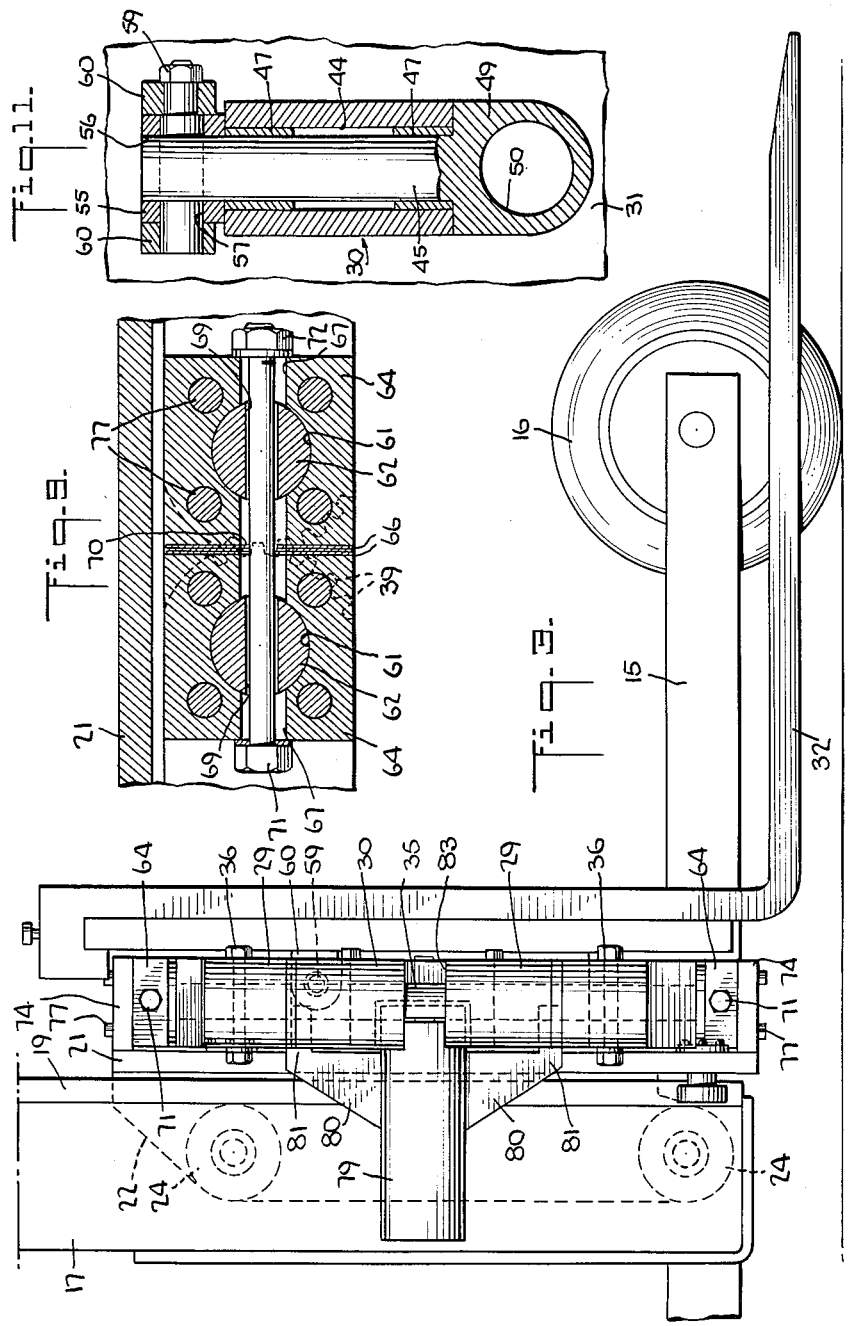

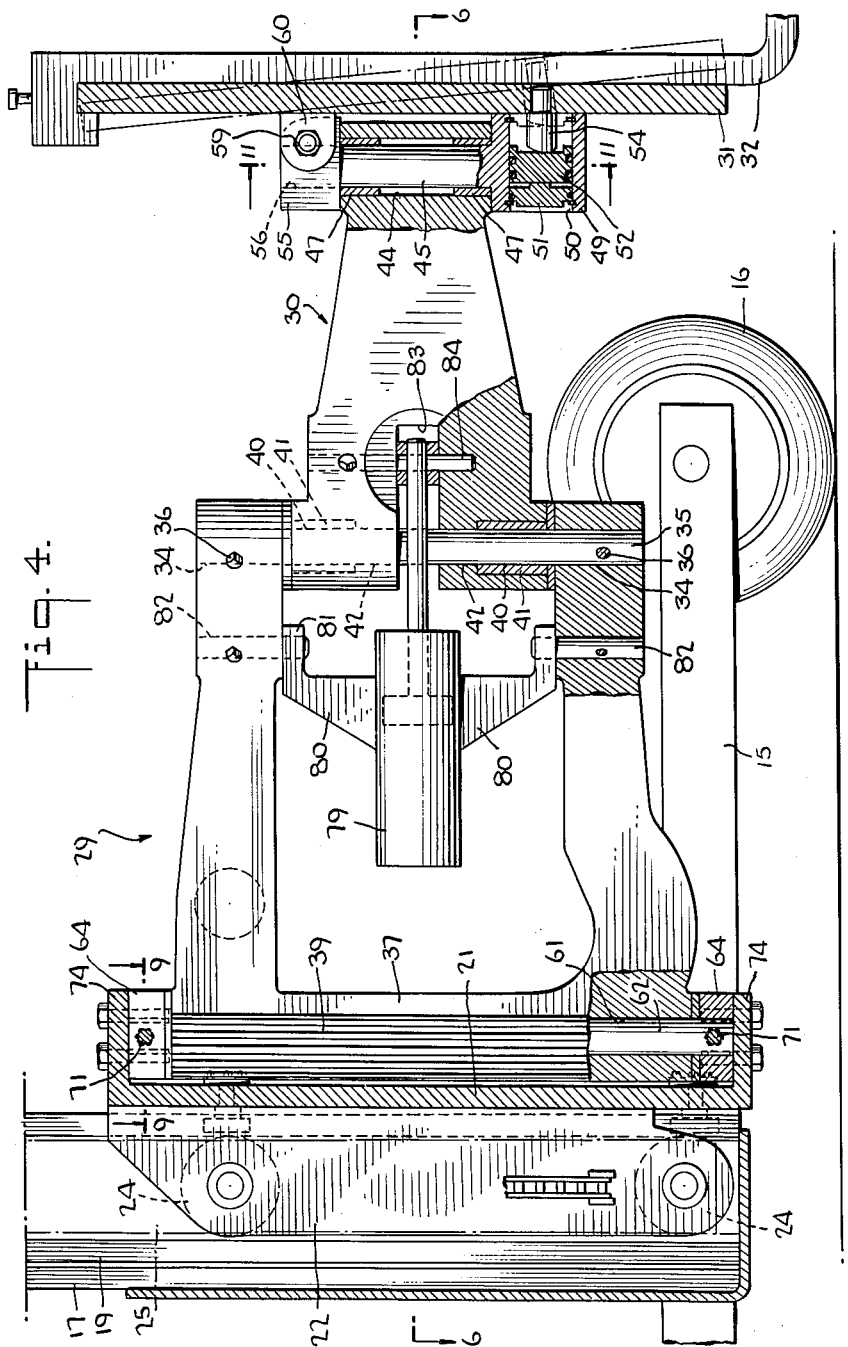

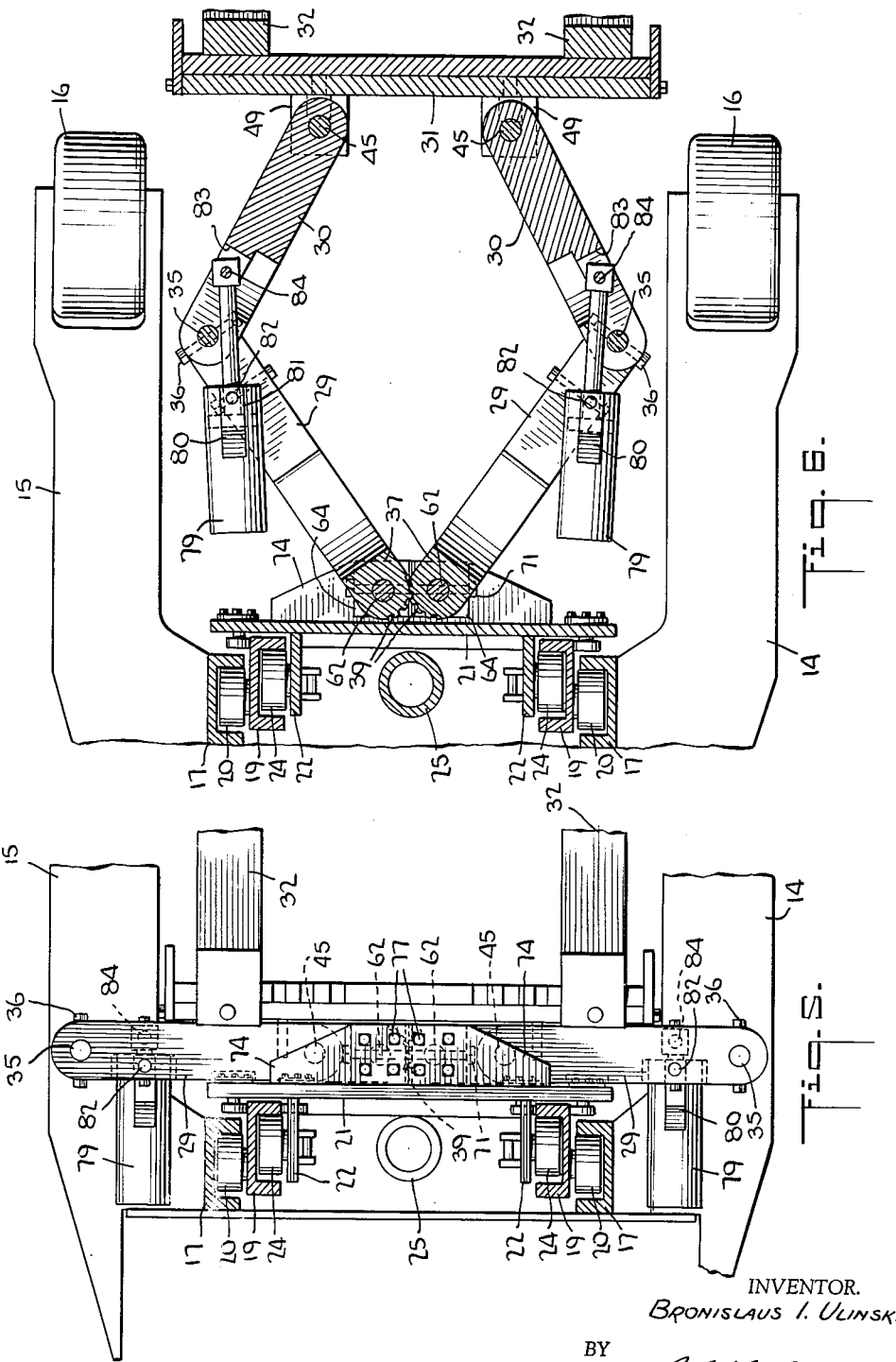

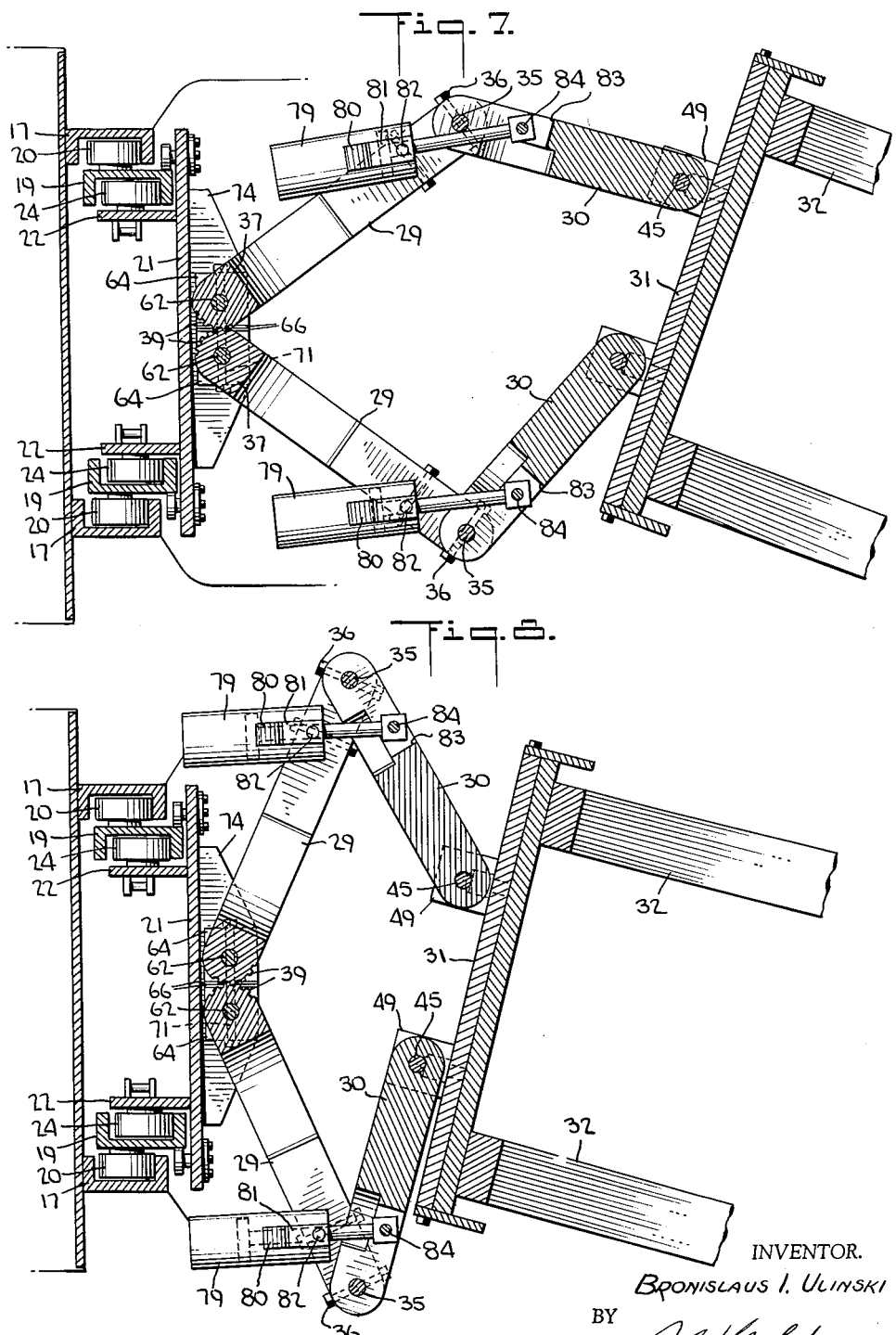

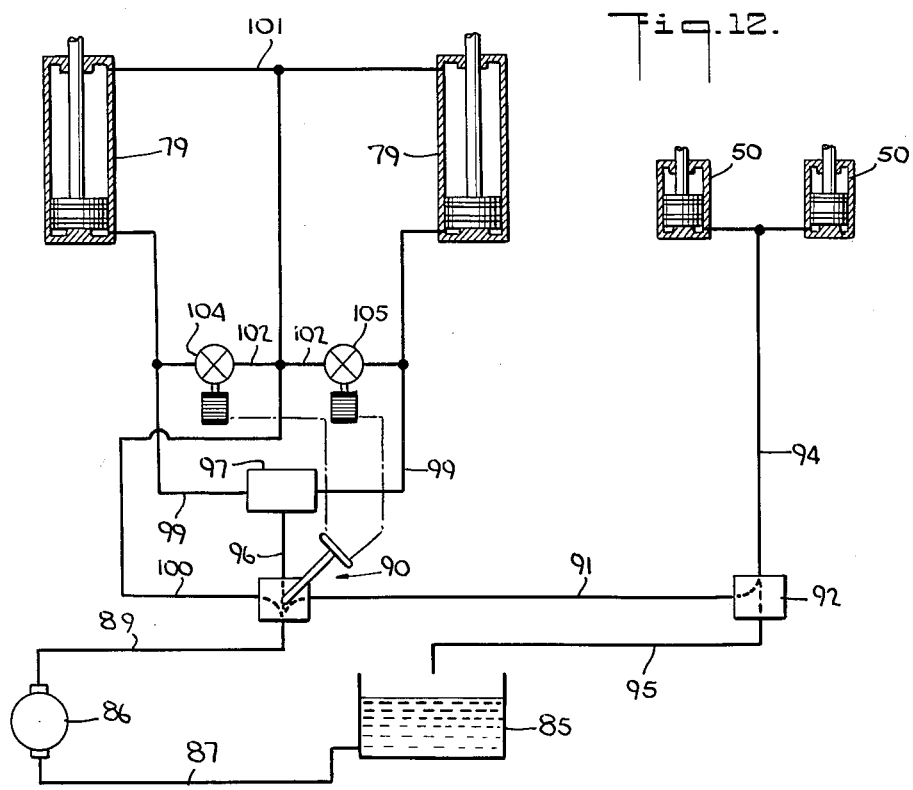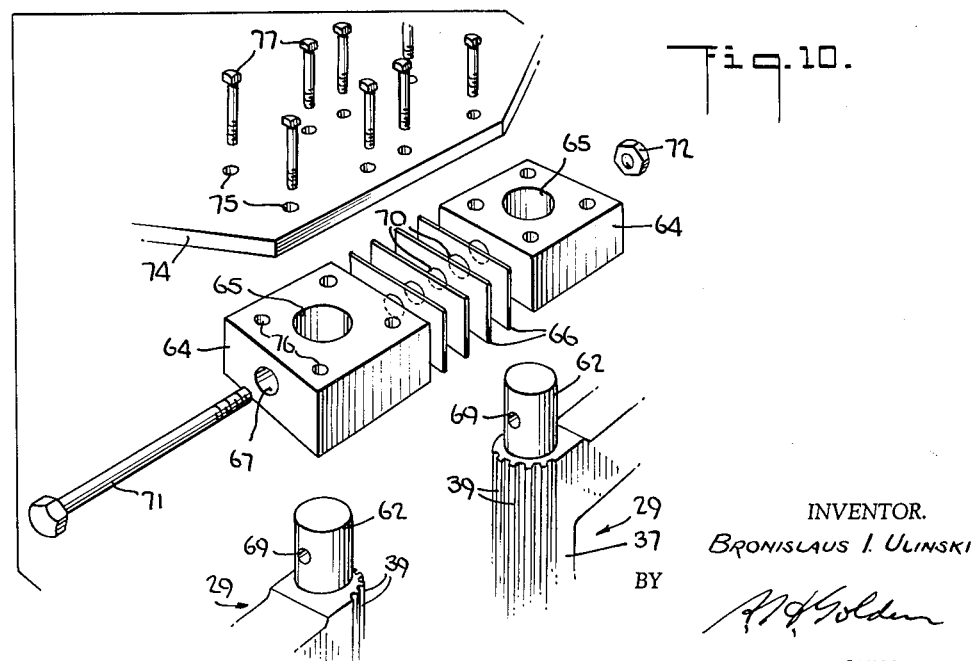

United States Patent Office 2,975,923
Patented Mar. 21, 1961

2,975,923

SWINGING AND EXTENDING FORKS

Bronislaus I. Ulinski, Flossmoor, Ill., assignor to The Yale and Towne Manufacturing Company, Stamford, Conn., a corporation of Connecticut Filed Oct. 13, 1958, Ser. No. 766,998

7 Claims. (Cl. 214—730)

This invention relates to an industrial truck, and, more particularly, to such a truck equipped with mechanism for extending and retracting a load relatively to the frame of the truck and for swinging the load laterally relatively to the frame of the truck.

A recent development involving trucks of the class described comprises the utilization of a leverage system employing levers that pivot about vertical axes so that they move in horizontal planes. This concept represents a substantial improvement over previous load extending leverage systems that employ levers moving in vertical planes and occupying a large amount of vertical space so as to severely limit the maximum load lifting height of a truck. However, so far as I know, no such load extending and retracting mechanism has been developed that is adapted to swing a load laterally.

Those persons skilled in the art will readily appreciate the desirability of a load carrier that may be readily swung from side to side while still being movable endwise to and from the truck frame to facilitate not only the deposit and lifting of the load, but also the movement of the truck in relatively narrow aisles.

I have conceived by my invention a novel construction that enables me, while maintaining complete load stability, to extend and retract a load carrier without limiting the height to which the load carrier may be elevated, and that also enables me to swing the load carrier from side to side for relatively considerable distances, without carrying the load far to one side of the truck during the swinging motion.

As a particular feature of my invention, the mechanism is so arranged that the load carrier, while capable of movement outwardly away from the truck frame, may be brought into close juxtaposition to the uprights of the truck on which the load is adapted for vertical movement.

As a more particular feature of the invention, I utilize a load carrier adapted to swing about vertical axes that are themselves adapted to swing, so that the effect is to contribute considerable swinging movement to the carrier. Moreover, the carrier may be swung in various positions spaced endwise from the truck.

As a still more particular feature of the invention, the load carrier is adapted for movement towards and away from the truck through the operation of a pair of hydraulic rams, these very same rams also effecting the swinging movement. Thus, my invention makes possible a very considerable manipulation of the load carrier through the operation of but two simple hydraulic rams.

As a further feature of the invention, the load carrier is adapted for tilting movement about a horizontal axis so as to tilt the load rearwardly or forwardly on this axis whenever such movement is necessary.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

A specific embodiment of the invention has been chosen for purposes of illustration and description, and is shown in the accompanying drawings.

In the drawings:

Fig. 1 is a perspective view of an industrial truck equipped with my fork extending and swinging attachment;

Fig. 2 is similar to Fig. 1, but shows the forks in extended position;

Fig. 3 is a side elevational view of the front end of a truck equipped with structure in accordance with my invention and showing the forks in retracted position;

Fig. 4 is similar to Fig. 3, but has parts broken away and shows the forks in extended position;

Fig. 5 is a top plan view of the front end of a truck equipped with structure in accordance with my invention and showing the forks in retracted position;

Fig. 6 is a sectional view taken along the line 6—6 of Fig. 4;

Fig. 7 is similar to Fig. 6, but shows the forks extended and swung to one side;

Fig. 8 is similar to Fig. 7, but shows the forks partially extended and swung to one side;

Fig. 9 is a sectional view taken along the line 9—9 of Fig. 4;

Fig. 10 is an exploded perspective view of means whereby I assemble parts of my fork extending and swinging mechanism;

Fig. 11 is a sectional view taken along the lines 11—11 of Fig. 4; and

Fig. 12 is a schematic view of a hydraulic system that I use to power my attachment.

Referring to the drawings, and more particularly to Figs. 1 and 2, it will be seen that for the purpose of description, I have chosen to illustrate my novel truck 10 constructed with a conventional front traction end 11. This traction end may be equipped at opposed sides with a driving and steering wheel and a caster wheel (not shown). The driving and steering wheel is controlled by a hand wheel accessible to an operator at an operating station 12. The details of the traction end 11 and its wheel arrangement are not important to an understanding of my invention, it being necessary to understand only that the truck is steered and driven through its front end.

For supporting the rear end of the truck, I utilize a pair of legs 14 and 15 that extend rearwardly from the opposite sides of the front end and that are each provided with a rear wheel 16. As will be readily appreciated by those persons skilled in the art, the disposition of the wheels 16 in widely spaced relation to one another enables the load to be carried between the wheels, thereby contributing great stability to the truck and enabling one to handle loads in a novel way as will be realized as the description proceeds.

Between the front and rear wheels of the truck, I mount on the truck frame a pair of I beams 17 to serve as primary uprights. Secondary uprights 19 are movable vertically relatively to primary uprights 17 and are guided by rollers 20 rotatably carried on secondary uprights 19 and extending into channels in primary uprights 17, as best shown in Figs. 5 to 8.

As shown in Figs. 4 to 8, I utilize a base or back plate 21 for supporting my extending leverage mechanism and a load carrier, as will be later described. The base plate has a pair of rearwardly extending brackets 22 that support rollers 24 for vertical movement in secondary upright channels whereby the base plate 21 may move vertically relatively to the secondary uprights. A hydraulic ram 25 (Figs. 1, 2, 5 and 6), together with a sheave bearing cross-head 26 and chains 27, serves to elevate the secondary uprights relatively to the primary uprights and the base plate relatively to the secondary uprights in a manner well known in the art.

Referring now to Figs. 1 to 4, it will be seen that I have mounted on the base plate 21 a pair of base levers 29. These levers 29 may pivot relatively to the base plate about vertical axes at one end of the levers as will later be described. The opposite end of each of the levers 29 is arranged to pivotally support one end of a load lever 30; and the opposite end of each load lever 30 is pivotally connected to a load plate 31 that constitutes a support for the load carrier 32, in this instance illustrated as load forks.

Each of the base levers 29 is generally U-shaped in profile as best seen in Fig. 4 and the free ends of the arms of the U are bored at 34 to receive a pivot pin 35 that is held in position by bolts 36. The web 37 of the levers 29 was provided with a series of longitudinal gear teeth 39, and the levers 29 are so arranged on the base 21 that their teeth 39 are in intermeshing relation, as shown, for example, in Fig. 6.

The load levers 30 are each bored at one end, as at 40 to receive bushings 41, and are also counterbored as at 42. The load levers 30 are mounted for pivotal movement between the arms of the base levers 29 by means of the pivot pin 35 that passes through the bushings 41 and counterbore 42.

As shown in Figs. 4 and 11, the ends of the load levers 30 opposite the base levers 29 are each formed with a vertical bore 44 for reception of a pivot pin 45 and a pair of bearing sleeves 47. The lower end of the pin 45 extends beyond the bore 44 and is enlarged as at 49. This enlarged portion has a horizontal bore 50 fitted with an end plug 51 and a piston 52, the rod 54 of which engages the load plate 31. A block 55 has a vertical bore 56 to receive the upper end of the pin 45, and a horizontal bore 57 to receive a bolt 59 that also passes through a pair of apertured brackets 60 integral with the forward surface of the load plate 31. With this construction in mind, it will be seen that the load levers 30 may pivot relatively to the base levers 29 about the vertical pins 35, and also relatively to the load plate 31 about the vertical pins 45. The load plate, as well as the load carrier 32, may be tilted about the horizontal bolt 59 by movement of the piston 52 in the bore 50.

I shall now describe the assembly whereby I mount the base levers 29 on the base 21, and for this purpose reference will be made to Figs. 4, 9 and 10. As I have already stated, the web portions 37 of the U-shaped base levers 29 are provided with a series of longitudinal gear teeth 39. Each web portion also has a longitudinal bore 61 for the reception of pivot pins 62. The pins 62 extend beyond the ends of the web portions 37 and their upper and lower ends are embraced by blocks 64 that have bores 65 for that purpose.

In order to secure the blocks 64 to the pins 62, and to provide for the proper adjustment of the gear teeth 39 relatively to one another, I insert shim plates 66 between the blocks, the number of shim plates, of course, depending upon the amount of spacing required for proper operation of the gear teeth. The blocks 64, pins 62 and shim plates 66 have coaxial bores 67, 69 and 70, respectively, extending therethrough to receive a bolt 71 that is held in assembled position by a nut 72. To secure this assembly to the base 21, I form the base 21 with upper and lower forwardly extending flanges 74 so disposed that the upper flange overlies the upper blocks 64 and the lower flange underlies the lower blocks. The flanges 74 have a series of holes 75 that register with bores 76 in the blocks, but are slightly larger in diameter than the bores. This construction permits the flanges and blocks to be secured together by bolts 77, while allowing some movement of the blocks relatively to the flanges to allow flexible use of the shim plates 66.

To effect extension, retraction or swinging movement of the load carrier, I provide two double acting hydraulic rams 79. These rams are each mounted between the arms of one of the U-shaped base levers 29 by means of wing brackets 80 having lugs 81 pivoted to the arms by pivot pins 82. The piston rod of each ram extends rearwardly of the truck towards the load plate and into a recess 83 in the adjacent load lever 30 to which it is pivotally connected by a pivot pin 84.

For the purpose of describing the operation of my invention, I shall assume that the normal position of the apparatus is that shown in Fig. 5, with the base levers 29 extending laterally of the truck and the load levers 30 in nested relation to the base levers. When it is desired to extend the load carrier to the position shown in Fig. 6, it is merely necessary to extend the rams 79 an equal amount. Such extension will naturally cause the load levers 30 to pivot relatively to base levers 29 about pivot pins 35. However, since the load levers cannot separate from each other at their ends connected to the load plate, the load plate is thrust outwardly, and the reaction to the thrusting force causes the base levers to pivot outwardly about pivot pins 62. This pivotal movement of the base levers is maintained equal by the gear teeth 39. To retract the load carrier, the rams 79 are retracted causing the levers 29 and 30 to pivot inwardly until the position shown in Fig. 5 is again reached.

The load carrier may also be swung to either side at any of its extended positions, that is, either partially extended as shown in Fig. 8, or fully extended, as shown in Fig. 7.

I shall now describe a hydraulic system that may be utilized to control the operation of my novel construction, and in this connection I shall refer to Fig. 12. I provide a hydraulic fluid reservoir 85 connected to a pump 86 by a conduit 87. A second conduit 89 connects the pump outlet to a four-way valve and actuator 90. A conduit 91 leads from the four-way valve to a three-way valve 92 that has an outlet connected by conduit 94 to the tilt ram cylinders 50, and a second outlet connected by return conduit 95 to the reservoir. From the description of the hydraulic system thus far, it will be seen that to tilt the load plate relatively to the load arms, fluid is pumped from the reservoir by the pump and directed by the four-way valve and the three-way valve to the cylinders 50. The valve 92 may also direct the fluid back to the reservoir.

The four-way valve may also be actuated to direct fluid through a conduit 96 to a flow divider 97 that meters the same amount of oil through conduits 99 to each of the rams 79, regardless of the fluid pressure, thus assuring forward movement of the load carrier while maintaining the base and load plate parallel.

To retract the carrier, the four-way valve is actuated to direct fluid to the opposite ends of the rams 79 through conduits 100 and 101. Fluid then flows through conduits 99 in a reverse direction to the flow divider 97 which meters the return flow to assure equal retraction of the rams.

To enable the forks to swing to one side or the other, I provide a pair of conduits 102 that connect the conduit 100 with each of the conduits 99. However, these connecting conduits 102 are provided with normally closed solenoid valves 104 and 105. To swing the forks to the right, as shown in Figs. 7 and 8, the normally closed solenoid valve 104 connecting the left hand cylinder conduit 99 to the conduit 100 is opened by an electrical contact on the actuator of the four-way valve. Left hand cylinder conduit 99 is then opened to conduit 100.

The left hand ram 79 is therefore hydraulically inactive, as fluid may pass through conduits 101, 100 and 102, open solenoid valve 104, and conduit 99 from one side of the piston to the other side of the piston. At the same time, right hand ram 79 receives full fluid flow through conduits 100 and 101 to only one side of the piston, causing the right hand load lever to retract. Because the load ends of the load levers cannot separate, the left hand load lever will hinge slightly in a retractive direction, moving the piston of the left hand ram with it and permitting the forks to swing to the right. Such movement of the left hand load lever and the piston of the left hand ram is possible because, as previously pointed out, the left hand ram is hydraulically inactive at the time.

To swing the forks back towards the left, the solenoid valve 105 is opened to equalize pressure on both sides of the right hand ram piston, and the solenoid valve 104 is closed. Fluid directed into conduit 100 will swing the forks to the left in the same manner as has already been described to swing the forks to the right.

From the foregoing description, it will be seen that I have conceived a novel construction that enables me, while maintaining complete load stability, to extend and retract a load carrier without limiting the height to which the load carrier may be elevated, and that also enables me to swing the load carrier from side to side for relatively considerable distances.

I believe that the construction and operation of my novel load extending and swinging mechanism will now be understood and that the advantages of my invention will be fully appreciated by those persons skilled in the art.

I now claim:

1. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end to said load carrier at a point laterally spaced from the load lever of the other arm whereby said load carrier may be moved horizontally relatively to said base member by folding movement between the base lever and load lever of each arm, separate means operatively interconnecting the base lever and load lever of each arm for effecting folding movement of the base lever and load lever of each arm independently of the folding movement of the base lever and load lever of the other arm whereby said load carriage may be selectively moved toward and away from said base member and moved angularly relatively to said base member, and means interconnecting the base lever on one arm and the base lever of the other arm for causing equal and synchronized angular movement of the base levers.

2. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end to said load carrier at a point laterally spaced from the load lever of the other arm whereby said load carrier may be moved horizontally relatively to said base member by folding movement between the base lever and load lever of each arm, separate means operatively interconnecting the base lever and load lever of each arm for effecting folding movement of the base lever and load lever of each arm independently of the folding movement of the base lever and load lever of the other arm whereby said load carriage may be selectively moved toward and away from said base member and moved angularly relatively to said base member, and gear means interconnecting the base lever of one arm and the base lever of the other arm for causing equal and synchronized angular movement of the base levers.

3. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end to said load carrier at a point laterally spaced from the load lever of the other arm whereby said load carrier may be moved horizontally relatively to said base member by folding movement between the base lever and load lever of each arm, a separate ram for each arm operatively interconnecting the base lever and load lever of each arm and means for independently operating each ram to effect folding movement of the base lever and load lever of each arm independently of the folding movement of the base lever and load lever of the other arm whereby said load carriage may be selectively moved toward and away from said base member and move angularly relatively to said base member, and means interconnecting the base lever of one arm and the base lever of the other arm for causing equal and synchronized angular movement of the base levers.

4. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end of said load carrier at a point laterally spaced from the load lever of the other arm whereby said load carrier may be moved horizontally relatively to said base member by folding movement between the base lever and load lever of each arm, a separate ram for each arm operatively interconnecting the base lever and load lever of each arm, and means for independently operating each ram to effect folding movement of the base lever and load lever of each arm independently of the folding movement of the base lever and load lever of the other arm whereby said load carriage may be selectively moved toward and away from said base member and moved angularly relatively to said base member, and gear means interconnecting the base lever of one arm and the base lever of the other arm for causing equal and synchronized angular movement of the base levers.

5. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end to said load carrier at a point laterally spaced from the load lever of the other arm whereby said load carrier may be moved horizontally relatively to said base member by folding movement between the base lever and load lever of each arm, separate means operatively interconnecting the base lever and load lever of each arm for effecting folding movement of the base lever and load lever of each arm independently of the folding movement of the base lever and load lever of the other arm whereby said load carriage may be selectively moved toward and away from said base member and moved angularly relatively to said base member, means operatively connected with the base lever of each arm to effect synchronized angular movement of the base levers, and means supporting said load carrier on said load levers for tilting movement relative to said load levers about an axis substantially perpendicular to the axis of the folding movement of said levers.

6. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end to said load carrier at a point laterally spaced from the load lever of the other arm whereby said load carrier may be moved horizontally relatively to said base member by folding movement between the base lever and load lever of each arm, means operatively connected with the base lever of each arm to effect synchronized angular movement of the base levers, separate means operatively interconnecting the base lever and load lever of each arm for effecting folding movement thereof, means for selectively actuating both of said separate means to move said load carriage toward and away from said base member and for rendering one of said means inactive and actuating the other of said separate means to move said load carriage angularly relatively to said base member.

7. In a truck of the class described, a base member, a load carrier, a pair of arms for supporting said load carrier on said base member for horizontal movement relatively to said base member, each arm including a base lever and a load lever, the base lever of each arm being pivotally secured at one end to said base member and pivotally secured at the other end to one end of the load lever, the load lever of each arm being pivotally secured at its other end to said load carrier at a point laterally spaced from the load lever of the other arm whereby said load carrier may be moved horizontally relatively to said base member by folding movement between the base lever and load lever of each arm, means operatively connected with the base lever of each arm to effect synchronized angular movement of the base levers, a separate ram for each arm operatively interconnecting the base lever and load lever of each arm for effecting folding movement thereof, means for selectively actuating the rams of both arms to move said load carrier toward and away from said base member and for rendering the ram of one arm hydraulically inactive and actuating the ram of the other arm to move said load carrier angularly relatively to said base member.

References Cited in the file of this patent

UNITED STATES PATENTS

| | | |
|---|---|---|
| 518,633 | Steur | Apr. 24, 1894 |
| 2,449,863 | Ross | Sept. 21, 1948 |
| 2,672,249 | Ulinski | Mar. 16, 1954 |
| 2,752,058 | Gibson | June 26, 1956 |
| 2,787,393 | Horton | Apr. 2, 1957 |